(12) United States Patent
Fitz (10) Patent No.: US 6,236,789 B1
(45) Date of Patent: May 22, 2001

(54) COMPOSITE CABLE FOR ACCESS NETWORKS

(75) Inventor: Jonathan G. Fitz, West Columbia, SC (US)

(73) Assignee: Pirelli Cables and Systems LLC, Columbia, SC (US)

( * ) Notice: Subject to any disclaimer, the term of this patent is extended or adjusted under 35 U.S.C. 154(b) by 0 days.

(21) Appl. No.: 09/470,660

(22) Filed: Dec. 22, 1999

(51) Int. Cl.[7] .................................................. G02B 6/44
(52) U.S. Cl. ........................ 385/101; 385/100; 385/113; 385/111
(58) Field of Search .................... 385/101, 100, 385/103, 104, 111, 113

(56) References Cited

U.S. PATENT DOCUMENTS

| | | | |
|---|---|---|---|
| 4,365,865 | * 12/1982 | Stiles | 385/101 |
| 5,268,971 | * 12/1993 | Nilsson | 385/101 |
| 5,469,523 | * 11/1995 | Blew | 385/101 |
| 5,677,974 | 10/1997 | Elms et al. . | |

FOREIGN PATENT DOCUMENTS

| | | | |
|---|---|---|---|
| 295 09 905 U | 11/1995 | (DE) | H01P/3/00 |
| 302502A2 | 2/1989 | (EP) | H04B/3/36 |
| 0969302A1 | * 1/2000 | (EP) . | |
| 969302A1 | 1/2000 | (EP) | G02B/6/44 |

OTHER PUBLICATIONS

Patent Abstracts of Japan—vol. 16, No. 188—May 7, 1992.
Patent Abstracts of Japan—vol. 12, No. 449—Nov. 25, 1988.
Patent Abstracts of Japan—vol. 15, No. 236—Jun. 18, 1991.

* cited by examiner

Primary Examiner—Cassandra Spyrou
Assistant Examiner—Leo Boutsikaris
(74) Attorney, Agent, or Firm—Norris, Mc Laughlin & Marcus; L. P. Brooks (57) ABSTRACT

A composite cable for conveying electrical energy and optical signals from a source or sources thereof to electrically energized units which process the optical signals. The cable has one or more buffer tubes, each buffer tube encircling at least two optical fibers for supplying optical signals to at least two of the units, each unit having electrical current and voltage requirements. The cable has a layer of S-Z stranded electrically insulated conductors around the buffer tube or tubes, and pairs of conductors are selected in size to safely supply the current and voltages required by at least two units. The number of pairs of conductors is less than the number of active optical fibers which excludes conductor spares. Preferably, the buffer tubes are S-Z stranded. The cable also includes a strength member and an outer plastic jacket encircling the buffer tubes, the conductors and the strength member.

26 Claims, 6 Drawing Sheets

COMPOSITE CABLE FOR ACCESS NETWORKS

FIELD OF THE INVENTION

The present invention relates to a composite cable for conveying electrical and optical energy to electrically energized units of an optical fiber network, which also process the optical energy and more particularly, a composite cable containing both optical fibers for providing optical signal service to optical network units (ONUs) in an optical fiber network and electrically conductive elements for supplying electrical energy to electrically power ONUs in the network to which the optical fibers provide optical signal service.

BACKGROUND OF THE INVENTION

Optical fiber is now used in a variety of telecommunication applications because of its small physical size and high bandwidth capacity.

An optical fiber access network provides for the distribution of telecommunications data among various locations, such as between a central office (CO) and a device at a location remote from the CO, often called an optical network unit (ONU), over optical fibers.

In many current optical access networks, the active components in the CO, which include optical and electrical devices, are electrically powered by the power that a power utility supplies directly to the building or facility housing the CO. The ONU likewise requires electrical power for converting optical signals to electrical signals for further processing and distribution and for converting electrical signals to optical signals for transmission back through the fiber network to the CO. The magnitude of the electrical current required by each ONU is normally in the range from 0.2 to 0.6 amperes and normally, the voltage magnitude for proper operation is in the range from 70–115 volts. This power can originate from the same source in the CO, or more often, originate from a power source located remotely from the CO or another ONU. This remote power source (RPS) typically converts AC power supplied by the power utility to a lower voltage DC power suitable for handling by communications craftpersons.

The most common method of carrying the power from the CO or RPS to the ONU is via a standard copper twisted-pair telephone cable or a standard coaxial cable, neither of which contains optical fiber. In addition, it has been proposed to carry the power by using a composite cable including groups of twisted-pair telephone wires bundled together in some fashion with a plastic tube or tubes containing optical fibers. See U.S. Pat. No. 5,268,971, incorporated by reference herein.

However, composite cables, such as those described in the '971 patent are unsatisfactory in terms of their size, scalability, maneuverability and taut-sheath accessibility. Conventional composite cables contain electrical conductors arranged as twisted pairs or bundles and have a large diameter. Two wires which are twisted can require more space than the same wires which are untwisted and grouped, and even more space than the same wires which are untwisted and arranged as a radial layer in a cable. See U.S. application Ser. No. 09/108,248, filed on Jun. 30, 1998, assigned to the assignee of this application and incorporated by reference herein. The contribution of the electrical conductors to the size of the composite cable limits the scalability of the cable design with respect to the number of optical fibers and electrical conductors which can be included in a cable, because the size of a cable utilized in optical fiber networks must satisfy present standards as to duct sizes, splice enclosures, entrance ports, installation equipment and termination hardware. Also, a composite cable which has a large diameter is extremely bulky and can be heavy and, thus, hard to maneuver in storage and installation. In addition, conventional composite cables are not constructed to allow for ease of mid-span or taut-sheath access to the optical fibers without damage to the electrical conductors when the electrical conductors surround the optical fibers in the composite cable.

Furthermore, the need for twisting the telephone wires when they are used for power distribution is disappearing in modem fiber access networks because of an increased confidence in the reliability of the fiber network as the only communications medium and a decreased interest in having communication-grade twisted-pairs available for future use.

In optical fiber networks which include optical and electrical connections between prior art composite cables and ONUs of the networks, the composite cables typically include one or more pairs of electrical conductors of a small gauge, such as about 19–24 AWG. To keep the cable diameter small, each conductor pair of the prior art composite cable was designed to convey electrical energy sufficient to electrically power only one of the ONUs to which an optical fiber of the cable was to be coupled and provide optical signal service, i.e., receive optical signals from or transmit optical signals to the ONU. In such composition cables, the size or gauge of the conductors of the conductor pairs was, in part, selected so that the resistance of the conductors would not cause an excessive voltage drop between the electrical power source, which normally supplies power at 130 volts, and the ONU. Wires of small gauge could be used because the current requirement of one ONU, and hence, the voltage drop between the electrical power source and the ONU, was relatively small. Generally speaking, when the wire gauge was selected so that the voltage drop did not exceed a permissible amount, the electrical energy to be conveyed over the conductor pair would not overheat the wire to a temperature which can damage other cable components and adversely affect the optical transmission characteristics of the cable, i.e. the conductor wire had a safe current carrying capacity.

As is known, both the heating and the voltage drop are dependent upon the resistance of the conductor and upon the current magnitude, and the voltage drop also depends upon the length of the conductor which can be thousands of feet, between the source and the ONU. Since the volume resistivity of a conductor depends upon the metal or metal alloy used, the remaining variable for controlling heating is the conductor size or gage. In the prior art, the conductor size or gauge usually was selected so as not to exceed the permissible voltage drop, the heating in the expected length of conductor and the current magnitude in the worst case in field installation. By so selecting the conductor size, only one conductor size was needed for all expected installations.

Thus, the conductors of a conductor pair in the prior art composite cables were designed to have a predetermined resistance R based on the formula:

$$R = p1/(\pi d^2/4)$$

where p is the volume resistivity of a conductor, d is the diameter of the conductor and 1 is the length of the conductor.

The current density (j) in a conductor is set forth by the relationship:

$$j = I/A$$

where I is the current magnitude and A is the cross-sectional area of the conductor. Since current density determines the conductor heating, it is also apparent that if the heating is to remain constant and at a safe level when the current is increased, the cross-sectional area of the conductor must be increased, e.g. if the current is increased three times, the area must be increased three times. Assuming that the conductor is circular in cross-section, the area A increases with the square of the conductor radius so that the area of the conductor increases rapidly with increases in conductor diameter.

A further problem with the prior practice is that the electrical conductors were cut at a point along the cable near the ONU. The conductors, after processing, were secured to the ONU terminals which normally are of a size which can receive only small size wires, e.g. of 19–24 gage. If the free lengths of the conductors were not sufficient to reach the terminals, splices were required.

Although the conductor pairs within a composite cable can be arranged to minimize the increase of the overall cable diameter (see said U.S. application Ser. No. 09/108,248), high fiber count cables would require larger numbers of such conductor pairs to provide that the ONUs which are optically served by the fibers in the cable also can be separately electrically powered by conductors of the cable. It is known, however, that increasing the number of conductors in the composite cable can limit scalability in terms of optical fiber and electrical conductor capacity and also cause manufacturing difficulties by increasing the number of adjustments to the stranding positions of conventional conductor stranding equipment which must be made when the conductors are stranded on the cable, as is commonly performed. Also, for a composite cable with a larger number of conductors, the accessibility to the conductors and any optical fibers underlying the conductors is adversely affected. The difficulty of identifying a pair of the conductors to be coupled to an ONU and the corresponding optical fibers which are for coupling to the same ONU is increased. Further, the procedure for cutting the desired conductors for electrically coupling them to an ONU and then terminating the cut conductors at the cable is more complex, especially where several ONUs are to be supplied with electrical energy from the cable at or near the same location on the cable.

Some current composite cable designs include two separate cables which are enclosed within a sheath, where one of the cables conveys only optical signals and the other cable conveys only electrical energy to electrically power all ONUs to which the optical fibers in the one cable are to supply optical signal service. These composite cable designs are extremely impractical, especially for cables having a high optical fiber count or high bandwidth optical fibers which are under development and becoming more prevalent, because the available overall cable diameter is inefficiently used, thereby limiting the scalability of such cables. Cables of this type also have limited flexibility.

Therefore, there exists a need for a composite cable which is compact, has a small diameter, is lightweight, mechanically protects the optical fibers from damage, is scalable in terms of optical fiber and electrical conductor capacity, allows for ease of mid-span or taut-sheath fiber access without harm to either the fibers or the conductors, optimizes use of overall cable diameter for conveying electrical energy, eases identification of the conductors and the corresponding optical fibers or optical fiber carrying elements which are for coupling to the same ONUs, simplifies coupling of the conductors and the corresponding optical fiber or fiber elements to an ONU during an installation and is compatible with modem optical access network limitations and standards.

SUMMARY OF THE INVENTION

An object of the invention is to increase the number of devices or ONUs requiring electrical power which are supplied with electrical power from pairs of conductors in the composite cable and which are provided with optical signal service by optical fibers in the composite cable without significantly increasing the size of the cable and at the same time simplifying the electrical connections of the devices to the conductors and providing ease of access to the conductors and the optical fibers for coupling the devices thereto. To provide such result:

(1) The electrical conductors are arranged in a single layer and are S-Z stranded around the optical fibers or their carriers, e.g. buffer tubes and/or ribbons;

(2) The number of pairs of electrical conductors is less than the number of optical fibers;

(3) The resistance of the conductors, and hence, the gauge thereof, is selected so that with the anticipated length of the conductors from the CO or RPS to the ONU most remote from the CO or RPS, the voltage drop does not exceed a predetermined value, i.e. the value which would reduce the voltage at the most remote ONU to a voltage below the operation voltage of the most remote ONU:

(4) The current carrying capacity of the conductors is such that each pair of conductors can supply sufficient electrical energy to at least two of the ONUs which are coupled to optical elements in the cable without heating which exceeds a predetermined safe level. For brevity, such capacity will hereinafter be identified as "safe current carrying capacity";

(5) For meeting the electrical current requirements for two of the most common ONUs, the electrical conductors have a safe current carrying capacity of at least 0.4 amperes, and relatively low resistivity, e.g., a wire gage of 16 AWG or less, and preferably, 14 AWG, for copper wire, or if each conductor is formed by bundled or stranded wires, the current carrying and resistivity equivalent; and (6) Preferably, when the optical fibers are disposed around the axis of the cable, the optical fibers or their carriers are S-Z stranded around such axis.

In accordance with one embodiment of the present invention, a composite cable for conveying optical signals and electrical energy to a plurality of optical network units (ONUs) includes a plurality of optical fibers, at least one for each of the plurality of ONUs, and at least one pair of insulated electrical conductors, each pair of electrical conductors being capable of supplying the current and voltage requirements of a plurality of ONUs. The optical fibers are loosely contained in at least one plastic buffer tube and can be individual fibers, fibers in groups or bundles or fibers in ribbons. The electrical conductors, which can be a solid wire or stranded wires covered with insulation or can be bundles of solid or stranded wires with or without insulation around each solid wire or stranded wire, are S-Z wound around the buffer tube or tubes in side-by-side relation to form a conductor layer with a thickness in the direction radially of the cable axis which does not significantly exceed the cross-sectional dimension of the single conductor or bundle of conductors as the case may be. The number of pairs of conductors intended for supplying power to ONUs is less than the number of optical fibers intended for supplying optical signals to, or conveying optical signals from, such ONUs. However, there can also be spare or "dummy" conductor pairs and optical fibers in the cable for use in the event of failure of conductors or optical fibers, the addition of ONUs or an increase in service to the ONUs. Preferably, the buffer tube or tubes are S-Z stranded.

The gage and metal of the conductors are selected as set forth hereinbefore, namely, to have a resistance which will not produce an excessive voltage drop at the ONU most remote from the CO or RPS which normally means that the conductors will have a safe current carrying capacity. Preferably, each conductor is of the appropriate gage and resistance for the expected length of cable from the power source to the most remote ONU receiving electrical power from the conductors. For example, the conductors can be made of 14 gauge (AWG) copper wire having a safe current carrying capacity of at least 15 amperes and a D.C. resistivity of about 2.6 ohms/thousand feet when the conductors are to supply power to only two ONUs. If the number of ONUs to be supplied by a pair of conductors is more than two, the gage and capacity can be increased, if necessary, to the values required for the increase in current resulting from the addition of further ONUs.

The number of conductor pairs in relation to the number of optical fibers in the composite cable depends upon the number of ONUs to which the optical fibers provide service. Thus, as distinguished from the prior art in which there is a pair of conductors for each ONU served by the optical fibers, there is only one pair of conductors corresponding to the two or more optical fibers providing service to at least two ONUs, and such relationship sometimes will be identified hereinafter as an "electrically corresponding" relationship. The number of optical fibers in the cable will exceed the number of pairs of active conductors, i.e. conductors being used to supply power to the ONUs.

For example, let it be assumed that a plurality of optical fibers all provide optical service to a plurality of ONUs. In this case, there would be one pair of electrical conductors corresponding to such plurality of optical fibers, and such pair of electrical conductors would provide electrical power to the plurality of ONUs. Thus, the ratio of the number of pairs of electrical conductors in the composite cable to the number of optical fibers in such cable is defined by:

$$\text{ratio} = n_c/n_{of}$$

where $n_c$ is the number of pairs of electrical conductors providing power to a plurality of ONUs and $n_{of}$ is the number of optical fibers serving the same plurality of ONUs. The number of optical fibers serving ONUs, i.e. active fibers which excludes spares or inactive fibers, will be greater than the number of pairs of conductors, and therefore, the ratio is less than one.

In addition, the conductor units are S-Z stranded longitudinally along the length of the cable to provide flexibility and ease of mid-span and taut-sheath access to the conductor units or to optical fibers or other conductors or conductor units in the composite cable surrounded by the layer of conductor units. Preferably, a layer of water swellable tape or yarn is disposed between the buffer tube and the layer of conductor units and extends longitudinally along the length of the buffer tube. An outer plastic jacket surrounds the layer of conductor units.

In a preferred embodiment, the layer of conductor units includes an inactive conductor unit having one or more electrically insulated conductors which are reserved for future use and such reserve or "dummy" conductors are not considered in the predetermined ratio.

In a further embodiment, each of the conductor units can include only a single electrically insulated conductor having a thickness which defines the thickness of the layer of conductors.

In a further embodiment, the cable includes only one layer of the conductor units, each of the S-Z stranded conductor units includes only a single electrically insulated conductor and each of the conductors has substantially the same diameter. In still a further, preferred, embodiment, the number and size of the conductors in the single layer of S-Z stranded conductors are selected by optimization based on the predetermined optical signal service and electrical power requirements of the ONUs which are to be coupled to the cable; the anticipated cost, time and difficulty of manufacturing processes; the safe current carrying capacity of the conductors; the bandwidth of the optical fibers; packing density efficiency; ease of installation and identification of electrically corresponding optical elements and conductors, and limitations on the allowable overall cable diameter.

In one preferred embodiment of the single conductor layer composite cable, the cable includes an optical signal distribution element including at least two optical fibers or includes at least one optical fiber carrying means such as a buffer tube loosely containing an optical fiber ribbon or optical fiber bundle, where the optical fibers or optical fiber carrying means is for optical service to two or more ONUs.

In a preferred embodiment, the composite cable includes a central strength member, optionally, surrounded by plastic insulation, and a plurality of S-Z stranded plastic buffer tubes surrounding and extending longitudinally along the length of the central strength member. Each of the tubes loosely contains at least one optical fiber or a bundle of optical fibers and includes a flowable water blocking material, such as a thixotropic gel, which fills empty spaces in the buffer tube and does not restrict movement of the optical fibers in the buffer tube. The optical fibers of at least one of the tubes or at least one of the fiber bundles in a tube is for optical signal service to two or more ONUs. A water swellable tape or yarn is disposed around the S-Z stranded buffer tubes or placed in at least one of the interstices between the stranded buffer tubes and extends longitudinally along the length of the cable. An optional first inner plastic jacket surrounds the water swellable tape or yarn. At least one layer of insulated conductors, each having substantially the same diameter, is disposed around the buffer tubes, and the radial thickness of the layer does not exceed the diameter of the insulated conductors. The conductors are in side-by-side relation and S-Z stranded longitudinally along the length of the cable. The ratio of the number of pairs of S-Z stranded conductors to the number of buffer tubes or the fiber bundle(s) in the buffer tubes is a predetermined ratio less than one to provide that at least one pair of the conductors electrically corresponds to at least one buffer tube or fiber bundle which is for providing optical signal service to two or more ONUs. Preferably, the predetermined ratio is such that a pair of the conductors electrically corresponds to one buffer tube or one fiber bundle, each with at least two optical fibers. Optionally, a second inner plastic jacket surrounds the layer of conductors and a conductive armor is disposed around the second inner jacket and extends longitudinally along the length of the cable. An outer plastic jacket surrounds the conductive armor. Water-blocking or water swellable material fills at least some of any otherwise empty spaces between the first inner jacket and the outer jacket.

In a further preferred embodiment of the present invention, the composite cable includes a central plastic buffer tube which loosely contains optical fiber bundles or optical fiber ribbons arranged in a stack. At least one of the fiber ribbons or fiber bundles is for optical signal service to two or more ONUs. A layer of aramid or fiberglass strength members encircles the central buffer tube. At least one layer of insulated conductors having a thickness that does not exceed the diameter of the insulated conductors is disposed around the layer of strength members. The conductors in the layer of conductors are S-Z stranded longitudinally along the length of the cable. The ratio of the number of pairs of S-Z stranded conductors to the number of fiber bundles or the fiber ribbons is a predetermined ratio less than one to provide that at least one pair of the conductors electrically corresponds to at least one fiber ribbon or fiber bundle which is for optical serve to two or more ONUs. Preferably, the predetermined ratio is of a value such that a pair of the conductors electrically corresponds to every fiber ribbon or fiber bundle. An outer plastic jacket surrounds the layer of conductors. Optionally, an inner plastic jacket surrounds the layer of conductors and a layer of conductive armor may be disposed between the inner plastic jacket and the outer jacket. Waterblocking or water swellable material fills at least some of any otherwise empty spaces between the layer of strength members and the outer jacket and any otherwise empty spaces in the buffer tube.

In accordance with one aspect of the present invention, the composite cable is included in an optical network system, and the electrical conductors are coupled to an electrical energy source, such as a central office (CO) or a remote power source (RPS), and to a plurality of ONUs in the system. The cable conveys electrical energy sufficient to electrically power two or more of the ONUs to which one or more optical signal distribution elements in the cable are coupled and provide optical signal service, each of the optical elements including at least two optical fibers. In a preferred embodiment of the system, the composite cable includes a predetermined ratio of the number of pairs of electrical conductors to the number of optical elements to provide that at least one pair of the conductors electrically corresponds to at least one optical element which is for optical service to two or more ONUs. In a further preferred embodiment, electrical energy conveyed by the conductors in the cable is coupled to an ONU by utilizing wire taps on the conductors which do not require cutting of the conductors and by utilizing leads extending from the taps to the electrical terminals of the ONUs.

In a further preferred embodiment of the system, the electrical conductors of the conductor pairs are color-coded to identify the conductors of the same pair which correspond to one or more optical fibers, or one or more optical fiber carrying means, contained in the cable to provide that a pair of electrical conductors can be easily identified as corresponding to the two or more optical fibers or optical fiber carrying means which electrically correspond to the pair of conductors.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

The invention will be illustrated in connection with composite cables which include optical fibers loosely held in at least one plastic buffer tube and at least one layer of S-Z stranded, side-by-side electrical conductors units, each of the electrical conductor units comprising at least one insulated electrical conductor, where the number of pairs of electrical conductors is in a predetermined ratio to the number of optical fibers or the at least one buffer tube or an optical fiber carrying means, such as a buffer tube with an optical fiber ribbon or optical fiber bundle therein and where at least one pair of the conductors electrically corresponds to at least two of the optical fibers, the at least one buffer tube or at least one of the optical fiber carrying means. The layer of conductor units has a thickness substantially equal to the thickness of the individual conductor units, which thickness preferably is that of an electrical conductor, and surrounds the at least one plastic buffer tube.

Figure 1:
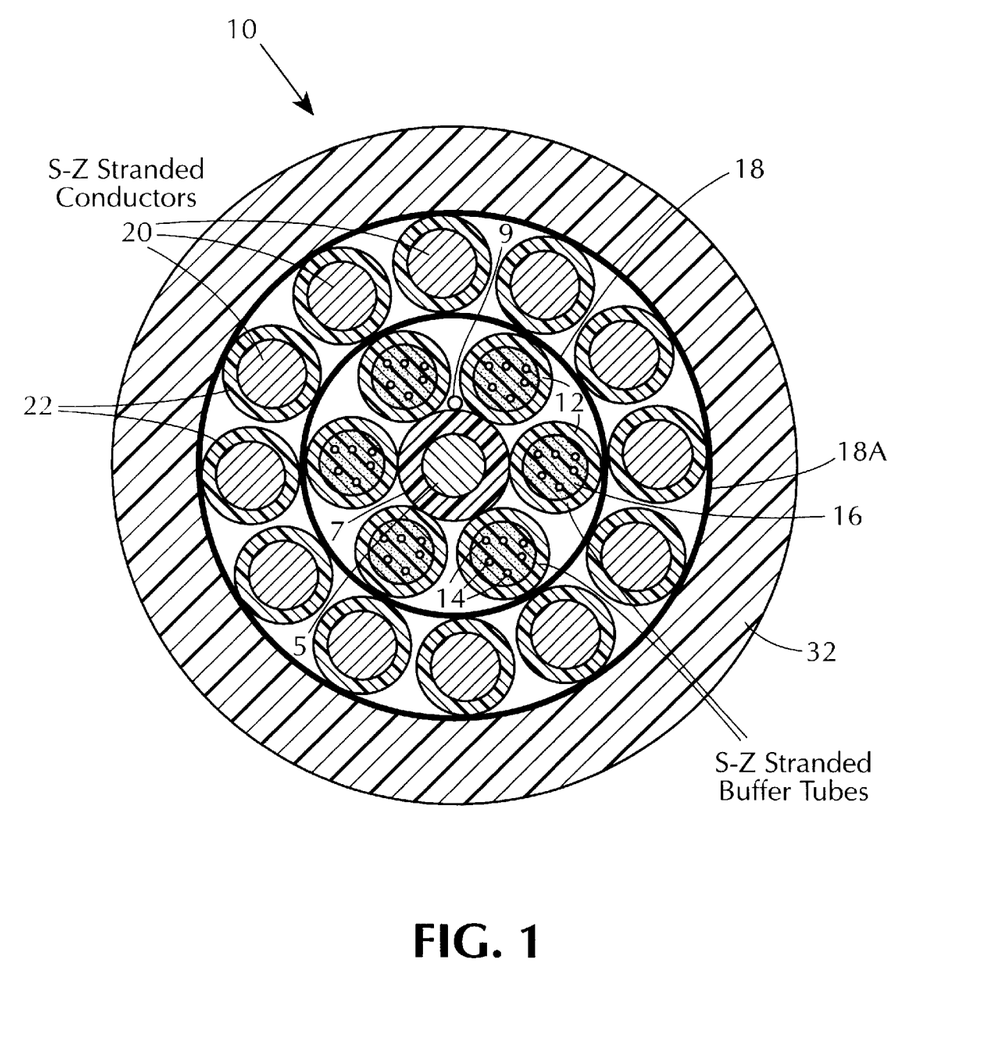
FIG. 1 is a cross-sectional view of an embodiment of a loose tube composite cable with S-Z stranded buffer tubes and S-Z stranded electrical conductors in accordance with the present invention.

FIG. 1 illustrates a preferred embodiment of a composite optical communications and electrical power cable 10 in accordance with the present invention. Referring to FIG. 1, the cable 10 includes a central strength member 5 which can be metallic or dielectric material and preferably, is surrounded by a plastic insulation coating 7. Six plastic buffer tubes 12, each of which loosely contains six optical fibers 14, are stranded longitudinally along the length of the strength member 5 in S-Z fashion, or reverse oscillating lay, which, as is known in the art, provides buffer tube slack at the portions where the direction of the winding of the buffer tubes 12 reverses. Preferably, the buffer tubes 12 are made of a polyolefin, such as PBT, polyethylene or polypropylene, or a polyester. Although illustrated as spaced from each other, the buffer tubes 12 can abut.

Each of the tubes 12 loosely contains an optical signal distribution element ("optical element") in the composite cable 10. Each optical element in the inventive composite cable includes at least one optical fiber which can carry optical signals to and/or from an ONU to which the optical fiber is coupled, thereby providing so-called "optical signal service" to the ONU. It is to be understood that the composite cable in accordance with the present invention includes at least two optical fibers and that the optical element can comprise a single optical fiber, an optical fiber ribbon, an optical fiber bundle or another known optical fiber element. Thus, if the optical element comprises only one optical fiber, there is a plurality of optical elements, but if there is only one optical element, the one optical element comprises a plurality of optical fibers.

A known type of flowable filling material 16, such as a water blocking compound, buffer tube filling material, oil or gel, fills some or all of the empty spaces within the buffer tubes 12 which are not occupied by the fibers 14, and permits the fibers 14 to move freely within the respective tubes 12.

The lengths of the fibers 14 preferably exceed the lengths of the tubes 12 by no more than fifteen hundredths of a percent, or EFL (Excess Fiber Length is <0.15%). In an alternative embodiment, the EFL can exceed 0.15% to avoid degradation of optical signal transmission quality in high tension applications of the cable 10.

To assist in moisture protection, one or more water swellable yarn, such as the water swellable yarn 9, is disposed longitudinally along the central strength member 5 in the interstices between the stranded buffer tubes 12 and the strength member 5. Alternatively, or in addition to the swellable yarn 9, the buffer tubes 12 can be surrounded by a solid water blocking material (not shown) which can be helically wound around the tubes 12. The water blocking material can, for example, be a known type of tape or a plurality of yarns both of which absorb moisture and swell.

Optionally, the buffer tubes 12 are enclosed by an inner plastic jacket 18 which preferably is of medium density polyethylene (MDPE). Electrical conductor units comprising electrical conductors 20 in side-by-side relation are disposed around and along the longitudinal length of the inner plastic jacket 18. Each of the conductors 20 is surrounded by insulation 22, such as high density polyethylene (HDPE), nylon or PVC. Although illustrated as spaced from each other, the conductors 20 can abut.

To minimize the cable size, each of the conductors 20 preferably is made of individual, high electrical conductivity conductors, such as copper or aluminum wires, of substantially the same diameter and provide a conductor layer of a radial thickness substantially equal to the diameter of the insulated conductors 20. Preferably, the conductors 20 are wound around the inner plastic jacket 18 in S-Z fashion to provide conductor slack at the portions where the direction of winding of the conductors 20 reverses for at least the reasons set forth in said application Ser. No. 09/108,248. The S-Z conductor stranding permits ease of access to the buffer tubes 12 where the conductors 20 reverse winding direction, without requiring cutting of the conductors 20, when a longitudinal portion of an outer jacket 32, described hereinafter, is removed or cut away.

Depending upon the gage and flexibility of the conductors 20 and the required flexibility of the complete cable, each of the conductors 20 can be single wires as shown in FIG. 1 or can be a compacted and stranded plurality of wires. For example, when the wire gauge is 14 AWG or a gauge of lower number, a single wire can be relatively stiff, and even though such single wire can have a slightly smaller diameter than a stranded conductor, it may be preferable to employ a stranded conductor when the gage is 14 AWG or of a lower number. Conversely, if the gage number is greater than 14, e.g. 16 or 18, it can be preferable to use single wire conductors. Preferably, to avoid an undesirable voltage drop with the expected current flow to two or more ONUs, the gauge number is 18 or less and preferably not more than 16 AWG.

The cable 10 is provided with the outer sheath or overall jacket 32 of material known in the art. For example, the overall jacket 32 may be formed by HDPE, MDPE, linear low density polyethylene (LLDPE), a low smoke halogen free (LSHF) material, poly(vinylchloride) (PVC) and the like.

Optionally, the cable 10 may be provided with a layer of armor (not shown) intermediate the overall jacket 32 and a second inner plastic jacket 18A. If the layer of armor is provided and the jacket 1 8A would be disposed intermediate the layer of armor and the layer of conductors 20. The armor can be of the controlled bond armor type and function in connection with the outer jacket 32 as described in said application Ser. No. 09/108,248. If the armor is not used, a layer of helically wound tape can be substituted for the plastic jacket 18A.

Optical fiber networks, which typically comprise a plurality of optical network units (ONUs), can include composite cables which convey electrical energy to electrically power and optical signals for optical signal service to ONUs in the network. The composite cables included in such networks, therefore, typically are designed to satisfy the optical signal service and electrical power supply requirements of the ONUs in the optical network to which the cable is to be coupled. In prior art composite cable design, however, a pair of electrical conductors in the cable, one of the pair being at ground potential and the other of the pair being at a potential above ground, was typically designed to convey electrical energy sufficient to satisfy the electrical power requirements of only one ONU which was to be coupled to the cable for optical signal service. Furthermore, since the current magnitude for one ONU was small, the conductors of the pair could be of a small size and, hence, a relatively high resistivity. Such conductors also had a safe current carrying capacity. Also, the number of conductors usually was equal to or greater than the number of optical fibers. The composite cable design feature of having pairs of conductors which can satisfy the respective electrical power requirements of only individual ONUs severely limits the scalability of the cable in terms of the number of ONUs which can be optically served and electrically powered by the cable and also limits the optical signal capacity of the cable.

In accordance with the present invention, the number of pairs of conductors in a composite cable, such as the cable 10 which is to be included in an optical network is in a predetermined ratio to the number of active optical fibers. For a plurality of active optical fibers, there is at least one pair of the conductors which can safely convey sufficient electrical energy to two or more ONUs to satisfy the respective predetermined electrical voltage and current requirements of the two or more ONUs to which a corresponding at least two optical fibers provide optical signal service. It is to be understood that the ONUs serviced by the composite cable 10 in the system 60 can be in one or more different optical networks.

Typically ONUs are rated to operate at about 130 volts DC and can tolerate and operate at lower than the rated voltage, e.g. 70–115 volts, because of the voltage drop which occurs between an ONU and the RPS or CO due to conductor resistance. In current practice, the RPS or CO supplies about 30–130 watts per ONU to be serviced by the composite cable and the power transmission efficiency may be about 85%, i.e., about 15% of the power is lost in transmission over the cable due to conductor resistance and other resistive losses. Thus, for example, if the current drawn by two ONUs is two amperes, the distance from the power source to the more remote ONU is 5000 feet, the voltage at the power source is 130 volts and the minimum operating voltage of the more remote ONU is 70 volts, then, preferably, conductor the size and resistivity of each of the two conductors supplying power to the more remote ONU should be selected so that the voltage drop is not more than 60 volts or 12 volts per thousand feet.

Figure 2:
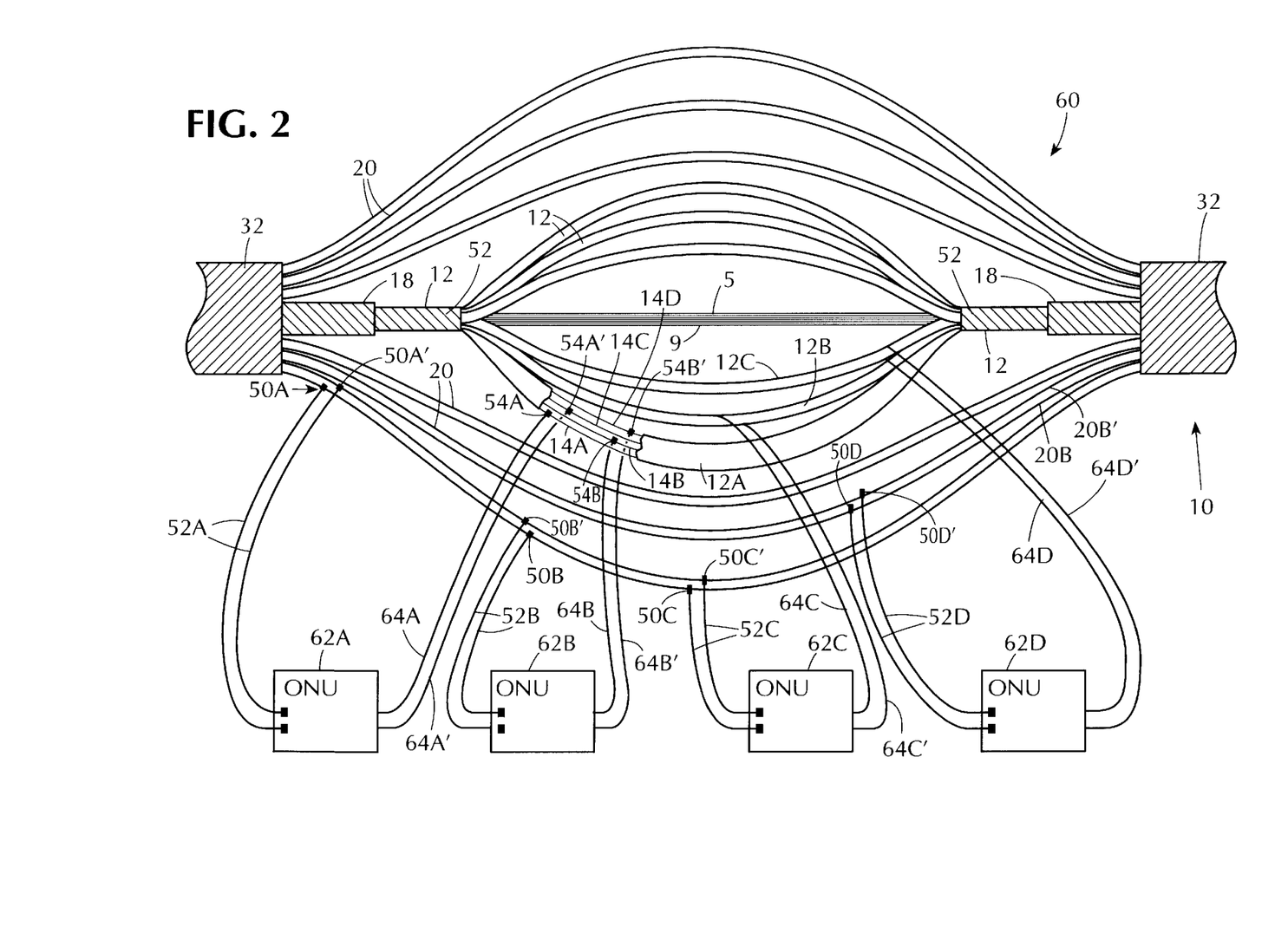
FIG. 2 illustrates an optical network system and schematically illustrates connections between optical network units (ONUs) and the optical fibers or buffer tubes and pairs of electrical conductors of the cable of FIG. 1 with the cable shown in longitudinal cutaway view.

FIG. 2 is a schematic representation of an optical network system 60 including the inventive cable 10 of FIG. 1 and a plurality of ONUs 62. Although FIG. 2 illustrates the ONUs coupled to the optical fibers and the electrical conductors at one opening in the cable 10, it will be apparent that the ONUs may be coupled to optical fibers and electrical conductors at separate openings, i.e., only one, or less than the number shown in FIG. 2, ONU is coupled to the fibers and conductors at a cable opening, the remaining ONUs being coupled to the fibers and conductors at different openings so that there are lengths of uninterrupted cable between the points at which the cable 10 is opened for access to the fibers and conductors. For ease of reference and to highlight the features of the present invention, the reference numbers of specific components in the system 60 are referred to below and in FIG. 2 with alphabetical suffixes.

Referring to FIG. 2, the electrical input of the cable 10 is shown in longitudinal view with a longitudinal length, or splice length, of the outer jacket 32 and if present, the jacket or layer 18A, stripped or cutaway to expose the conductors 20. Within the splice length, the S-Z stranded conductors 20 are shown pulled away from the inner jacket 18 and a length of the inner jacket 18 has been stripped away to expose the S-Z stranded tubes 12. A length of the exposed tubes 12 has been ballooned away from the central strength member 5. Further, a portion of the covering of the ballooned away buffer tube 12A has been cut away to expose the fibers 14. The cable 10 can be spliced and the components thereof accessed and exposed using conventional techniques, such as described in said application Ser. No. 09/108,248.

Referring again to FIG. 2, the electrical inputs of the ONUs 62A–C are connected, via conventional electrical power cable lines 52A–C, to the conductors 20A and 20A' of the cable 10 at respective wire taps 50A and 50A', 50B and 50B' and 50C and 50C'. Primed and unprimed reference numerals refer, respectively, to ground potential and a potential above ground potential. The ONU 62D is connected via lines 52D to the conductors 20B and 20B' of the cable 10 at respective wire taps 50D and 50D'.

The wire taps 50A–D can, for example, be wrapped joints, weld joints or clamp-on connectors, for connecting the conductors to the ONUs by way of lines 52A–D. Thus, the tapping method or device does not interrupt the conductor and hence, does not interrupt the conveyance of electrical energy along the length of the conductors of the cable 10. Thus, preferably, the conductors 20A and 20A' would not be cut, as was done in the prior art, where the conductors 20A and 20A' supply electrical energy to only ONU. Cutting of the conductors 20A, 20A' is unnecessary, and the avoidance of such cutting permits the uninterrupted supply of electrical energy to the ONUs 62B or 62C, assuming that the source of electrical energy or remote power source is connected to the cable 10 at the left side of the cable 10 shown in FIG. 2. The wire taps 50 are conventional and known in the art, such as Model No. 314 sold by 3M.

It will be observed that by using lines 52A-D connected to the conductors 20A and 20A' by taps, it not only is unnecessary to cut the conductors 20A and 20A' but such taps also permit the use of wires having a gauge number greater than, or size smaller than, the gauge of the conductors 20A and 20A' to connect the conductors 20A and 20A' to the terminals of the ONU. Thus, since the lines 52A–D conduct only the current for one ONU, the wire size can be smaller and can be readily connected to the terminals of existing ONUs, which as mentioned hereinbefore, normally accommodate wires having a gauge number of at least 19. Furthermore, the lines 52A–D can be of a length which will reach from the cable 10 to such terminals whereas it is sometimes difficult to expose a cut length of the conductors 20A and 20A' sufficient to reach the ONU terminals thereby requiring the splicing of lengths of wire to the cut lengths of the conductors 20A and 20A'.

Each of the buffer tubes 12 contains a plurality of active optical fibers, i.e., optical fibers providing optical signal service to ONUs. The tubes 12 can also include inactive or spare optical fibers.

Each of the ONUs 62A and 62B has an optical signal conveying element, e.g., a connector, for coupling each of the ONUs to one or more of the optical fibers 14 in the buffer tube 12A. For example, the optical signal conveying element of the ONU 62A is coupled to the active optical fiber 14A of a buffer tube 12A by optical fiber 64A and fusion splices 54A or a mechanical connector or other means known in the art. If desired, the fiber 14A can be cut to form the fusion splice thereby interrupting the continuity of the fiber 14A. The signal element of the ONU 62A can also be similarly optically coupled to a second active optical fiber 14C by an optical fiber 64A' at 54A'. The signal element of ONU 62B is similarly optically coupled to different fibers 14B and 14D at 54B and 54B' and fibers 64B and 64B'. Thus, the ONU 62A is connected to optical fibers different from the optical fibers to which the ONU 62B is coupled.

The optical fibers 14 (not shown) of a buffer tube 12B are similarly coupled to the ONU 62C via the optical fibers 64C and 64C' and a conventional optical fiber coupling means (not shown) similar to couplers 54A, 54A', 54B and 54B'. The ONU 62D is similarly coupled to the optical fibers 14 (also not shown) of the buffer tube 12C via the cable 64D and similar optical fiber coupling means. In the illustrated embodiment, the cable 10 is designed so that the pair of the conductors 20A, 20A' can safely convey sufficient electrical current to satisfy the electrical power and voltage requirements of the ONUs 62A–C.

Further, the cable 10 is designed so that active optical fibers 14 in the buffer tube 12B are for optical signal service to at least one ONU 62C and that the pair of conductors 20B, 20B' can safely convey sufficient electrical energy to the at least one ONU 62D to satisfy the electrical power and requirements of at least one ONU 62D.

It will be noted from a consideration of the system illustrated in FIG. 2, that the number of active optical fibers exceeds the number of pairs of electrical conductors and that at least one of the pairs of electrical conductors is selected to provide the electrical current required by at least two ONUs and the operating voltage required by the ONU most remote from the power source.

While FIG. 2 illustrates an example of a system in which the cable of the invention can be used, it will be understood by those skilled in the art that the cable of the invention can be used in other systems.

Further, in accordance with the present invention, the arrangement and disposition of the conductors in the inventive composite cable can be optimized in view of the following practical limitations and concerns as to ease of manufacture, storage and installation.

1) The overall cable diameter should, and in most circumstances must, conform to industry standards.

2) The conductivity, number, size and arrangement of the conductors to be included in the cable, and S-Z stranded around the optical elements by a stranding machine, affects the ease or difficulty of manufacture of the cable. In particular, the size or gage and the material composition of the conductors affects the current carrying capacity of the conductors, which in turn, affects the number of conductors to be included in the cable, which ultimately impacts the preferred wire arrangement and packing of the conductors within the cable. Further, the presence in the cable of conductors having only a single size improves packing density and manufacturing efficiency.

3) The optical fibers should be protected from damage during manufacture and installation.

4) Ease of access to the optical fiber carrying elements and the conductors is advantageous during anticipated field installations, such as when the outer jacket must be removed to access the fibers and conductors. In addition, the ease of identifying the two conductors of a pair and the electrically corresponding optical fibers or optical elements is also advantageous during an installation.

5) Further, simplifying and maintaining simple the connections of the conductors to the ONUs are desirable.

6) The scalability of the cable in terms of optical signal bandwidth and electrical energy carrying capacity of, respectively, the fibers and conductors selected also are considerations.

The optimization of a design of the inventive composite cable for a particular electrical power and optical signal service requirement can be performed by prioritizing one or more of the above discussed factors or considerations.

For example, if minimizing the size of the conductors to improve manufacturing efficiency is a high priority, the cable may include a larger number of conductors, such as by being arranged in layers as set forth in Ser. No. 09/108,248 and shown in FIG. 3 discussed hereinafter. The resultant tradeoff is that identification of the optical elements which electrically correspond to a conductor pair may become more difficult because the application of color coding to the conductors of a conductor pair and to the electrically corresponding optical element, as described in detail hereinafter, would be more complicated.

Alternatively, if minimizing the cable diameter is a priority, the cable may be designed to include only a single conductor layer having larger than usual conductors which contribute less to the overall cable diameter than would two layers of conductors having smaller diameter and which can convey the same amount of electrical energy as the one layer of conductors. The resultant tradeoff can make installation more difficult.

If ease of identification of the pairs of conductors which electrically correspond to the optical elements is of high priority, the conductors can be included in the cable in a ratio of a pair of the conductors for every optical element containing optical fibers.

In accordance with a preferred embodiment of the invention, the inventive composite cable can be constructed with a minimum of electrical conductors to ease cable manufacture, cable access, and installation at an ONU.

In a preferred embodiment of the cable 10, the conductors 20 have a gauge of 14 AWG and the diameters of the buffer tubes 12 closely correspond to the diameter of 14 AWG wire.

Preferably, the S-Z winding of the conductors 20 of the cable 10 provides that the S-Z reversals of the conductors 20 are in such close proximity that at whatever point the cable outer jacket 32 and layer 18A is accessed by removal or stripping away of a predetermined splice length of the jacket 32 from the cable 10, an S-Z reversal of the conductors 20 is not a longitudinal distance of more than about ⅓ to about ½ of the predetermined splice length from an adjoining S-Z reversal, such that two or three S-Z reversals are within the predetermined splice length. As a typical splice length is preferably about 29 inches, the S-Z reversals are advantageously spaced between about 9 inches and about 14 inches apart to ensure that S-Z reversals will be in close enough proximity to any given point on the conductors which can be optimally used for coupling to an ONU.

In a further embodiment, the buffer tubes 12 are applied with an S-Z winding having the same or substantially the same spacing between adjoining S-Z reversals that the S-Z reversals of the conductors have, such as, for example, between about 9 and about 14 inches apart. This spacing interval ensures that S-Z reversals of the tubes 12 are in close enough proximity to any given access point which can be optimally used for branching and splicing of the tubes 12 for a given splice length.

In some circumstances, a constraint on the minimum distance between adjoining S-Z reversals of the buffer tubes 12 may limit the cable performance, such as, for example, if the cable were to be exposed to adverse environmental or use conditions of high tension, low temperature, etc. Preferably, in such circumstances, indicia, such as markings, writings, perturbations, etc. can be included on the outer surface of the outer jacket 32 to identify the location of the S-Z reversals of the stranded buffer tubes 12 on the outer jacket 32, and therefore, overcome the above-said constraint on distances between adjoining S-Z reversals while ensuring optimal access to the tubes 12 at the desired location of the cable.

In a preferred embodiment, indicia such as color coding can be applied to the insulation 22 of a pair of the conductors 20, such as the conductors 20A and 20A', and to the outer surface of the electrically corresponding optical fibers 14 or buffer tubes 12 to provide for quick and easy identification, upon opening of the cable jacket 32, of the optical fibers 14 or buffer tubes 12 which electrically correspond to the conductor pair 20A, 20A'.

For example, a colored insulation stripe can be extruded on one conductor of the pair, such as the conductor which is to be at ground potential, and the color of the stripe on the one conductor corresponds to the primary color of the insulation of the other, or mate, conductor of the pair. The other conductor of the pair which is at a potential above ground potential includes an extruded colored insulation stripe which is the same color as the primary color of the insulation of the one conductor. The dual color coding permits a field technician, through positive identification, ease in installation of wire taps to the correct pairs of conductors to be coupled to an ONU. In an alternative embodiment, the layer of conductors may include a conductor with a solid colored insulation and a conductor with the same colored insulation and also bearing a stripe which is black or of some other readily discernible, contrasting color. The primary or base color for both conductors would match the color of one of the buffer tubes, and the black or contrasting stripe on one of the conductors would designate the polarity of that conductor.

In a preferred embodiment of the inventive composite cable 10 where more than one pair of the conductors are for electrically powering the ONUs which are to be served by optical fibers in one of the buffer tubes 12, for example, in a very high fiber count cable where one or more of the buffer tubes include a high number of fibers, more than one striping color could be disposed on the conductors. For example, the conductor can have a base insulation color matching the color of the electrically corresponding buffer tube and colored stripes on the conductor insulation which designate electrically corresponding optical fibers in the buffer tube.

In a further preferred embodiment, each of the buffer tubes 12 electrically corresponds to and is color-coded to a pair of the conductors 20. Referring to FIG. 2, for example, the buffer tube 12C can be colored blue to correspond to the conductors 20B and 20B' which, respectively, include blue insulation with an orange stripe and orange insulation with a blue mating stripe.

Figure 3:
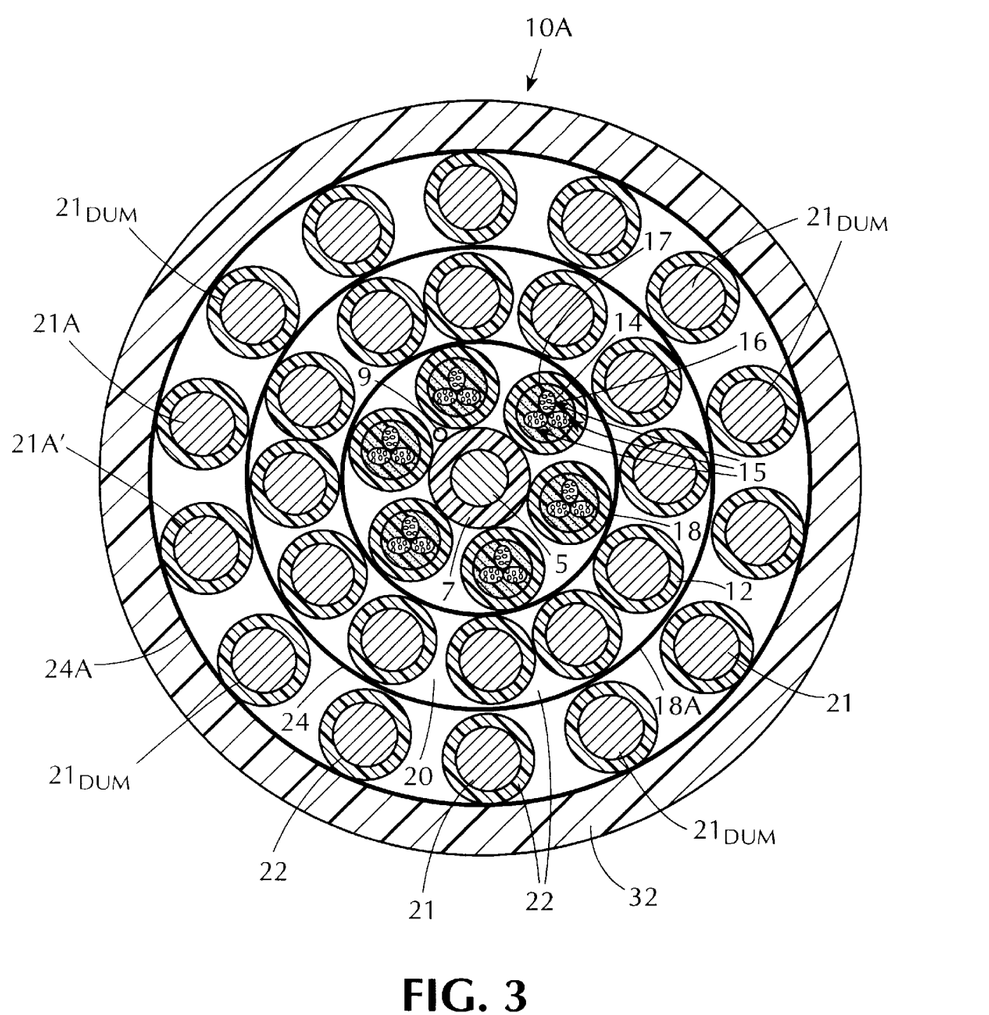
FIG. 3 is a cross-sectional view of an alternative embodiment of a loose tube composite cable in accordance with the present invention including more than one layer of electrical conductors and optical fibers bundled in groups within the buffer tubes.

FIG. 3 illustrates an alternative preferred embodiment of a loose tube composite cable 10A which is identical in structure to the cable 10 except for the addition of another layer of conductors and water swellable tapes and except that the optical fibers 14 are bundled, as described below. Like reference numerals are used to refer to elements having similar, and preferably identical, structural and functional characteristics as those described above in connection with the cable 10.

Referring to FIG. 3, each buffer tube 12 of the composite cable 10A includes three optical fiber cables with six optical fibers 14 which are bundled with a binding yarn 17 into groups 15 of three. The bundled groups 15 are loosely received in the buffer tubes 12 and water-blocking material 16 fills empty spaces within the tubes 12, as previously described. The optical fibers in at least one of the buffer tubes 12 or the bundled groups 15 are for optical signal service to two or more ONUs. The cable 10A further includes a second layer of insulated electrical conductors 21 which is similar in arrangement as the layer of conductors 20. The conductors 21 are disposed around a layer 24 of solid water swellable material, e.g. a tape, which encircles the layer of conductors 20. A layer 24A of solid water swellable material encircles the layer of conductors 21. The water swellable material 24 separates the layers of conductors 20 and 21 from each other. The tape 24A separates the layers of conductors 20 from the outer jacket 32.

In accordance with the present invention, the number of pairs of conductors 20 and 21 is selected so that at least one pair of the conductors 20 or 21 electrically corresponds to at least one of the buffer tubes 12 or fiber groups 15. Four of the conductors 21 in the second layer of conductors 21 can be so-called "dummy" conductors $21_{Dum}$ which constitute spare electrical conductors reserved for future use. These dummy conductors are not considered as conductors in the ratio of the number of pairs of conductors to the number of active fibers.

In an alternative embodiment, one or more of the dummy conductors $21_{Dum}$ can be replaced by other suitably sized elements having a modulus similar to the strength member 5 so as to provide one or more longitudinal strength members. Such strength members can be S-Z stranded with the other conductors 21 on the cable 10A to form the single layer of conductors 21 and strength members so as to maintain the cable 1 OA substantially round and ease stranding operations.

In a preferred embodiment, pairs of the electrical conductors 20 and 21 are color coded to electrically corresponding buffer tubes 12 and/or the binder yarns 17 which bind electrically corresponding bundled groups 15 of the optical fibers 14 in the buffer tubes 12.

In a further preferred embodiment, when the cable 10A is coupled to ONUs of an optical network system as described in FIG. 2, a pair of electrical conductors, such as the conductors 21A, 21A', can safely convey sufficient electrical energy to satisfy the electrical current and voltage requirements of all of the ONUs to which optical fibers in a corresponding buffer tube 12 or a corresponding bundled group 15 of optical fibers 14 provide optical signal service.

In an alternative preferred embodiment of the cable 10A, any or all empty spaces in the region where the layers of conductors 20 and 21 are disposed, i.e., between the inner jacket 18 and the outer jacket 32, are filled with a water blocking filling compound or additive. If such compound or additive is used, the layers of solid water swellable material or tapes 24 or 24A can be replaced by plastic layers similar to the inner jacket 18 and second inner jacket described in connection with FIG. 1. It is to be understood that further layers of conductors may be provided in the cable 10A in a similar manner as described above, if necessary, for a specific application.

Figure 4A:
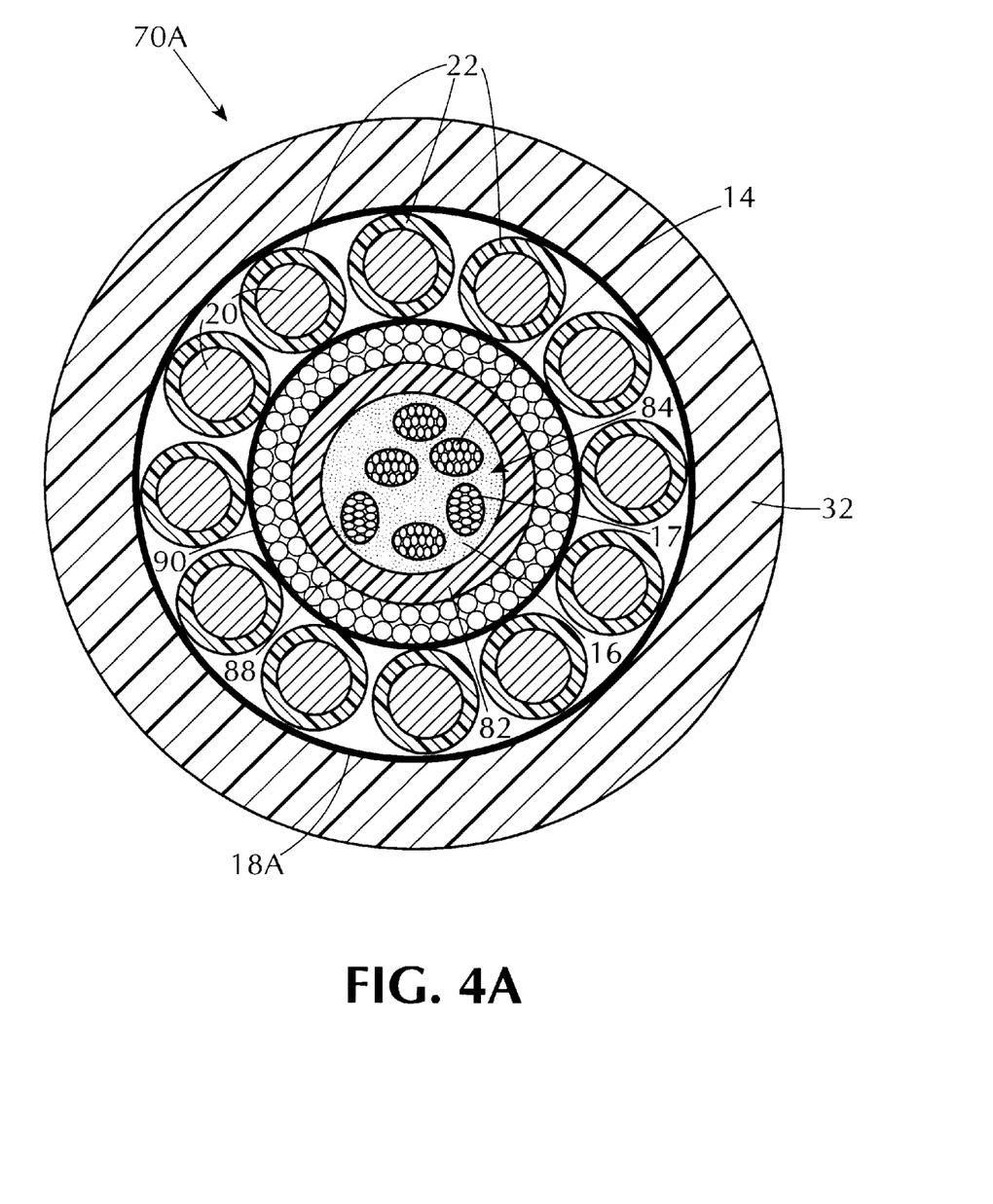
FIGS. 4A and 4B are cross-sectional view of central loose tube composite cables in accordance with the present invention including, respectively, groups of optical fibers and an optical fiber ribbon stack within the central tube.
Figure 4B:
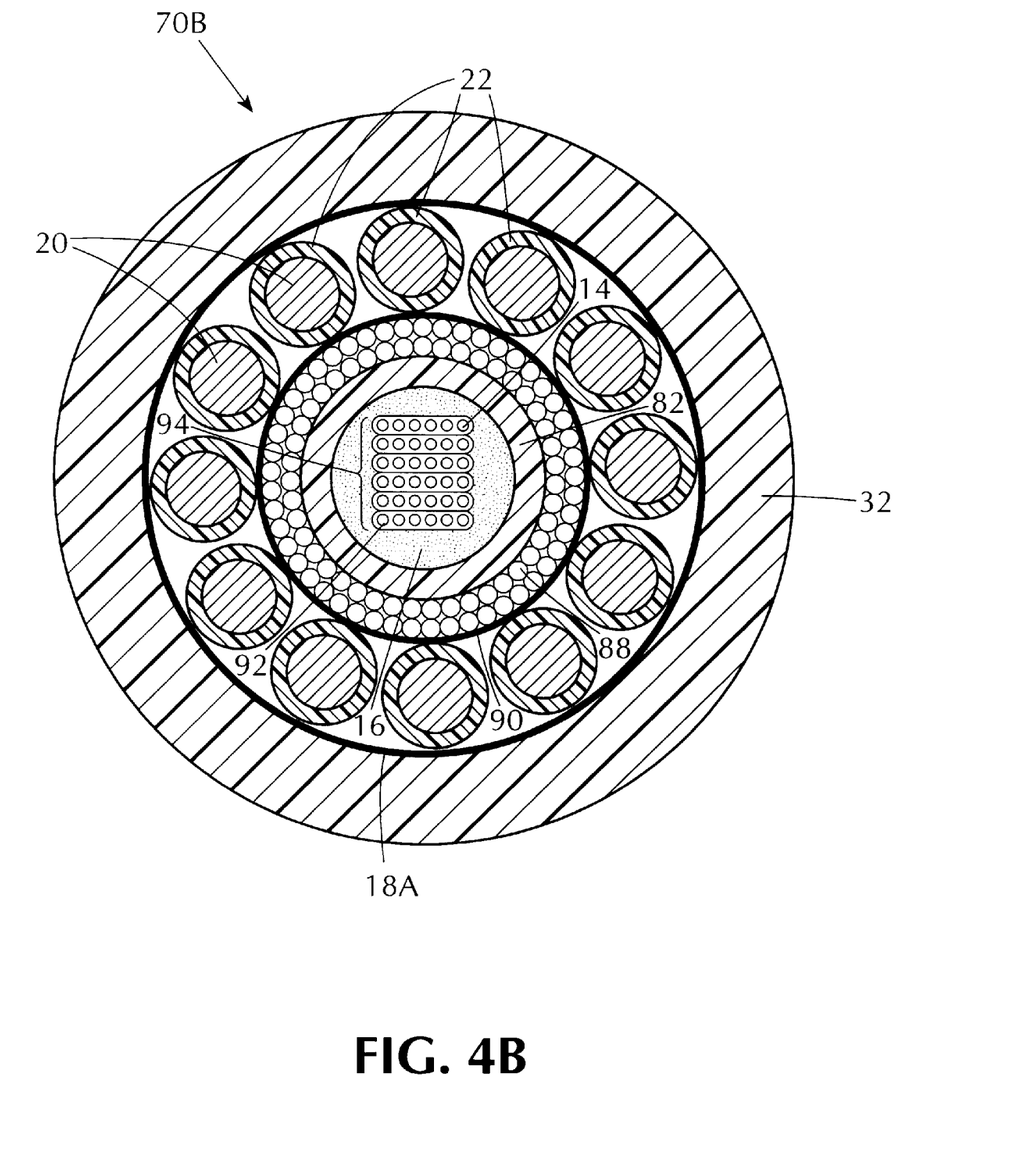

FIGS. 4A and 4B show cross-sections of central loose tube composite cables 70A and 70B, respectively, in accordance with further preferred embodiments of the present invention. Like reference numerals are used to refer to elements having similar, and preferably identical, structural and functional characteristics as those described above in connection with the cables 10 and 10A.

Referring to FIG. 4A, the composite cable 70A includes a central buffer tube 82 loosely containing optical fiber bundles 84. Each of the bundles 84 contains a plurality of optical fibers 14 and is for optical service to multiple ONUs. Empty spaces in the central buffer tube 82 are filled with a water blocking material 16, as previously described. A binder yarn 17 encircles and binds together the fibers 14 in each of the optical fiber bundles 84. Preferably, the binder yarn 17 on each of the bundles 84 is of a different color.

A layer of aramid or fiberglass strength members 88 encircles the buffer tube 82. A layer 90 of water swellable material, preferably longitudinally or helically applied tape, encircles the aramid strength members 88. Plastic insulated electrical conductors 20 are disposed around the layer 90 to form a single layer of conductors 20 and the conductors 20 are S-Z stranded longitudinally along the length of the cable 70A.

In a preferred embodiment, the pairs of electrical conductors 20 in the cable 70A are in a one to one ratio with the bundles 84 of optical fibers 14, and a pair of the conductors 20 can safely convey sufficient electrical energy to satisfy the electrical current and voltage requirements of all the ONUs to which the optical fibers 14 in a corresponding bundle 84 provide optical signal service.

Referring to FIG. 4B, the cable 70B is similar to the cable 70A as shown in FIG. 4A except that the cable 70B includes six optical fiber ribbons 92 arranged in the form of a ribbon stack 94 in the tube 82 in place of the bundles 84. Each of the ribbons 92 is for optical signal service to multiple ONUs. In a preferred embodiment, the ratio of the number of pairs of the twelve conductors 20 to the six optical fiber ribbons 92 is one to one so that each pair of electrical conductors 20 in the single layer of electrical conductors 20 electrically corresponds to one of the optical fiber ribbons 92 in the ribbon stack 94. As in the cable 70A, the electrical conductors 20 in a pair can be color-coded to each other and to the electrically corresponding ribbon 92.

Figure 5:
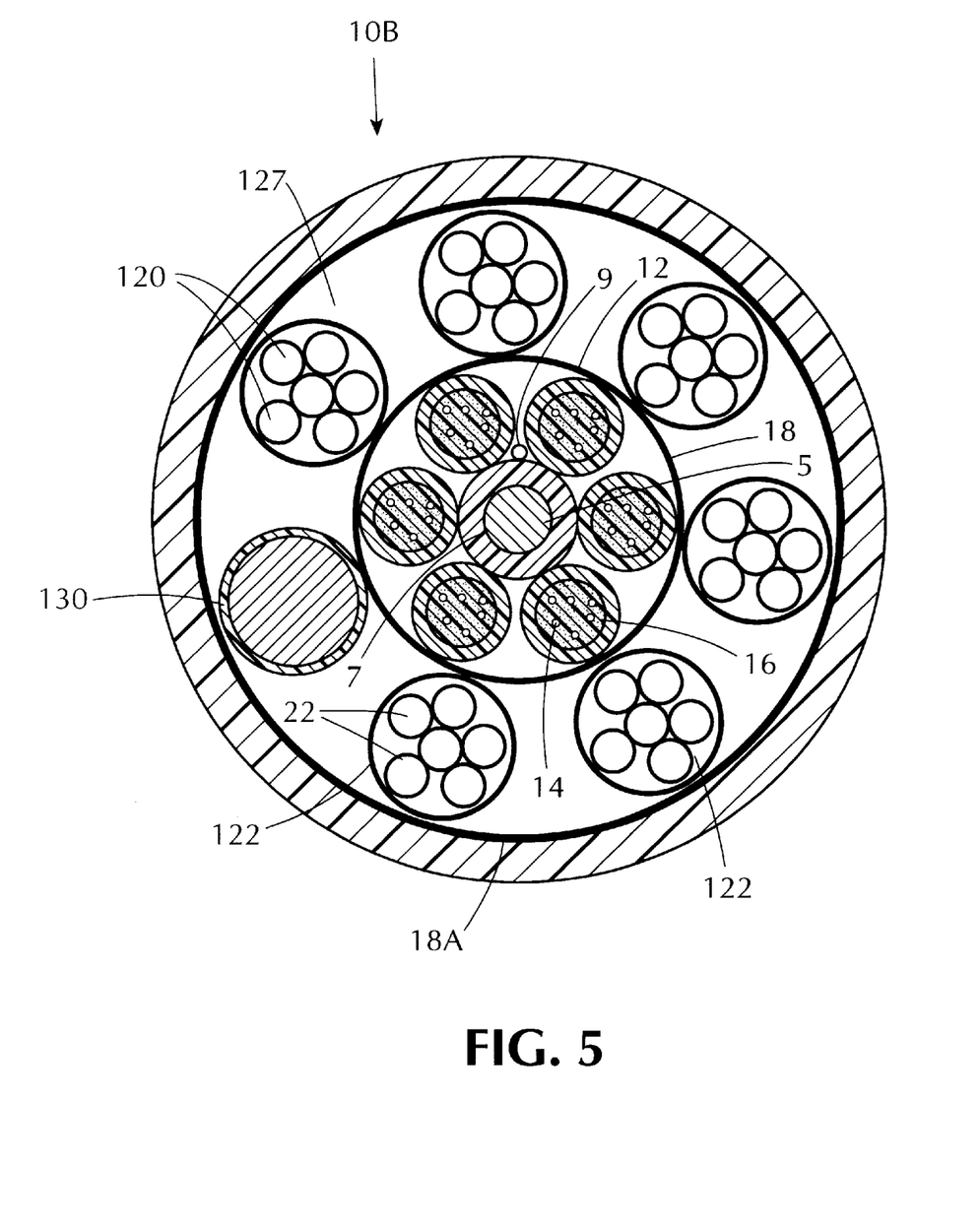
FIG. 5 is a cross-sectional view of an alternative embodiment of a loose tube composite cable in accordance with the present invention including bundles of electrical conductors which are S-Z stranded.

FIG. 5 shows a cross-section of an alternative embodiment of a loose tube composite cable 10B in accordance with the present invention. The cable 10B is identical in structure to the cable 10 of FIG. 1 except that the layer of conductors is arranged in a different form. Referring to FIG. 5, the cable 10D includes, preferably, six conductor or conductor units 122 disposed in side-by-side relation around and along the longitudinal length of the buffer tubes 12 to provide a single layer of conductor units 122.

Each of the conductor units 122 comprise a plurality of conductive wires 120 each of which can be surrounded by insulation 22. The cross-sectional dimension of each of the units 122 can be greater than the cross-sectional dimension of each of the buffer tubes 12. However, preferably, the cross-sectional dimension of the conductor units 122 is the same as the cross-sectional dimension of the conductors 20 shown in FIG. 1, and therefore, the gauge number of the wires 120 would have to be larger than the gauge number of the conductors 20. If the gauge number of the wires 120 is such that pairs of the conductors cannot safely supply the electrical current and voltage required by a plurality of ONUs, then, the insulation 22 can be omitted so that, in effect, each conductor unit 122 is a single conductor with multiple wires which can be stranded and compacted.

If the wires 120 are individually insulated, the wires 120 can be held together by binder threads 127. If the wires 120 are not individually insulated, i.e., the insulation 22 is omitted, the binder threads 127 can be replaced by a layer of insulation.

In a preferred embodiment, the conductor units 122 are S-Z stranded around the inner jacket 18 and the radial dimension or thickness, for all the units 122, is the same.

The layer of the conductor units 122 in the cable 10B, which preferably is a single layer, advantageously provides that the ratio of pairs of conductors to fibers can easily be changed in a prefabricated composite cable simply by changing the number of conductors 120 which are bundled in a group to form a conductor unit 122. The ratio can be changed, for example, to satisfy changes in the electrical power supply requirements for the cable, e.g., the number of ONUs in the network to which the cable is required to supply electrical power may change.

In a preferred embodiment of the cable 10B, the optical fibers in each of the buffer tubes 12 is for optical signal service to multiple ONUs and the six conductor units 122 electrically correspond, respectively, to the six buffer tubes 12, such that the predetermined ratio is one conductor unit 122 for every buffer tube 12, i.e., three insulated conductor pairs for six optical fibers. Preferably, one or more pairs of the wires 120 in a conductor unit 122 can safely convey sufficient electrical energy to satisfy the electrical current and voltage requirements of all of the ONUs to which the optical fibers 14 in the electrically corresponding buffer tube 12 are intended to provide optical signal service. Further, the binder threads 127 are preferably color-coded to the respective electrically corresponding buffer tubes 12.

In a preferred embodiment, each conductor unit 122 contains a predetermined number of pairs of insulated wires 120 and the wires 120 of each pair are color-coded to each other and to the fibers 14 in the electrically corresponding buffer tube 12.

In a further preferred embodiment, one or more of the conductor units 122 in the layer of conductor units can constitute only a single insulated electrical conductor 130, as shown in FIG. 5, which together with another conductor in the cable 10B can safely convey sufficient electrical energy to satisfy the electrical current and voltage requirements of all of the ONUs to which the optical fibers 14 of, for example, a high fiber count buffer tube 12, are intended to provide optical signal service. Preferably, the single electrically insulated conductor 130 has a gauge substantially similar to that of the conductors 20 as set forth above or to the thickness of the layer of conductor units 122.

In an alternative embodiment, dummy conductors of the same thickness as the conductor units 122 also can be included in the layer of conductor units 122 to improve and ease stranding or for future use. It is to be understood, however, that the thickness of a layer of conductor units 122 is preferably equal to the thickness of the conductor unit in the layer having the greatest thickness.

In a further alternative embodiment, the inventive composite cable can have a central loose tube optical fiber core as in the cables 70A or 70B and a layer of the conductor units 122 as in the cable 10B disposed around the core.

Although the buffer tubes and electrical conductors have been illustrated as spaced from each other in the circumferential direction of the cable, the buffer tubes can abut each other and the electrical conductors can abut each other. Also, if desired, some or all of any otherwise empty spaces within the outer jacket can be filled with a water-blocking compound.

Further, although the composite cable of the present invention has been described in connection with supplying electrical power and optical signal service to ONUs, other access network applications would be appropriate for the present invention.

Although preferred embodiments of the present invention have been described and illustrated, it will be apparent to those skilled in the art that various modifications may be made without departing from the principles of the invention.

What is claimed is:

1. A composite cable for conveying electrical energy and optical signals to a plurality of electrically energized units which process the optical signals, each of said units having predetermined electrical current and predetermined voltage requirements, the cable having a longitudinal axis and comprising:

at least one longitudinally extending plastic buffer tube loosely containing at least one optical fiber for optical signal service to at least two of said electrically energized units, wherein the number of optical fibers is at least two;

at least one longitudinally extending layer of a plurality of insulated electrical conductors, wherein said conductors are S-Z stranded in side-by-side relation around said buffer tube to provide a layer of conductors having a radial thickness substantially equal to the thickness of a conductor, wherein a pair of said conductors has a resistance selected so that when the sum of the predetermined current for two of said electrically energized units flows therein, the voltage drop along said pair of conductors satisfies said predetermined voltage, wherein said pair of conductors has a safe current carrying capacity for the current required by said at least two of said electrically energized units and wherein the number of pairs of conductors is less than the number of optical fibers;

a plastic jacket encircling the layer of conductors; and at least one strength member extending longitudinally of said cable and disposed inwardly of the outer surface of said jacket.

2. A composite cable as set forth in claim 1 wherein there is a plurality of buffer tubes in side-by-side relation and each buffer tube loosely contains a plurality of optical fibers.

3. A composite cable as set forth in claim 2 wherein said strength member is disposed at the longitudinal axis of the cable and the plurality of buffer tubes is S-Z stranded around the strength member.

4. A composite cable as set forth in claim 3 further comprising a layer of plastic encircling the buffer tubes and intermediate the buffer tubes and the conductors.

5. A composite cable as set forth in claim 4 further comprising a layer of plastic encircling the conductors and intermediate the conductors and the jacket.

6. A composite cable as set forth in claim 2 wherein there is a plurality of optical fiber bundles in each buffer tube.

7. A composite cable as set forth in claim 1 wherein each of said conductors is a single electrically conductive wire encircled by insulation.

8. A composite cable as set forth in claim 1 wherein each of said conductors is a plurality of electrically conductive wires.

9. A composite cable as set forth in claim 8 wherein each of the wires is encircled by insulation.

10. A composite cable as set forth in claim 1 wherein the current carrying capacity of each conductor is at least two amperes and the gauge and resistivity of each conductor are selected to provide a voltage drop of not more than 12 volts per thousand feet of the conductor.

11. A composite cable as set forth in claim 1 wherein said strength member is disposed at the longitudinal axis of the cable, wherein there is a plurality of buffer tubes stranded around said strength member and each buffer tube loosely contains a plurality of optical fibers and wherein there are two layers of insulated conductors, one of the layers encircling the other of the layers.

12. A composite cable as set forth in claim 11 wherein the plurality of buffer tubes are in side-by-side relation and are S-Z stranded.

13. A composite cable as set forth in claim 12 wherein the optical fibers are bundled together in a plurality of bundles.

14. A composite cable as set forth in claim 13 wherein pairs of electrical conductors have indicia thereon and the bundles of optical fibers have indicia for identifying the electrically corresponding conductors.

15. A composite cable as set forth in claim 11 wherein pairs of electrical conductors have indicia thereon and the buffer tubes have indicia thereon for identifying the electrically corresponding conductors.

16. A composite cable as set forth in claim 1 wherein pairs of electrical conductors have indicia thereon and the optical fibers have indicia thereon for identifying the electrically corresponding conductors.

17. A composite cable as set forth in claim 1 wherein the one buffer tube is disposed at the longitudinal axis of the cable and the strength member is outward of said buffer tube.

18. A composite cable as set forth in claim 17 wherein the optical fibers are bundled together in a plurality of bundles.

19. A composite cable as set forth in claim 17 wherein the optical fibers are contained in a plurality of plastic ribbons.

20. A composite cable as set forth in claim 17 wherein the strength member comprises a plurality of high tensile members disposed in a layer encircling the buffer tube.

21. A composite cable as set forth in claim 1 wherein the cross-sectional dimension of each electrical conductor is substantially equal to the cross-sectional dimension of the buffer tube.

22. An optical fiber communication system comprising:
a plurality of electrically energized units for processing optical signals, each of said units having predetermined electrical current and a predetermined electrical voltage requirements for operation in the processing of optical signals and having an electrical input and at least one optical signal conveying element;
a composite cable having a longitudinal axis and having electrical conductors for supplying electrical current at said predetermined voltage from an electrical source to a plurality of said units and having optical fibers for conveying optical signals between said units and other optical signal processing units, wherein said composite cable comprises:
a plurality of longitudinally extending optical fibers loosely received in at least one longitudinally extending buffer tube;
a plurality of longitudinally extending insulated electrical conductors disposed in side-by-side relation and S-Z stranded around the buffer tube or tubes;
a plastic jacket encircling the plurality of electrical conductors; and
at least one longitudinally extending strength member within said jacket
wherein at least one pair of said electrical conductors is coupled to the electrical inputs of a plurality of said units and each conductor has a resistance and size to provide the predetermined electrical current and predetermined electrical voltage required by the last-mentioned said plurality of units without overheating; and
wherein a plurality of said optical fibers is coupled to the optical signal conveying elements of the plurality of units to which said electrical conductors are coupled, the number of optical fibers coupled to the last-mentioned plurality of units being greater than the number of pairs of electrical conductors coupled to the electrical inputs of the last-mentioned said plurality of units.

23. An optical fiber communication system as set forth in claim 22 wherein the one pair of electrical conductors is coupled to the electrical inputs of a first plurality of said units and a first plurality of optical fibers is coupled to the signal conveying elements of the first plurality of units and wherein there is a second pair of electrical conductors coupled to the electrical inputs of a second plurality of said units and a second plurality of optical fibers is coupled to the signal conveying elements of the second plurality of units.

24. An optical fiber communication system as set forth in claim 22 wherein the conductors of at least the one pair of electrical conductors are coupled to the electrical inputs of a plurality of units by electrical conductors having a size smaller than the electrical conductors of the at least one pair of electrical conductors.

25. An optical fiber communication system as set forth in claim 22 wherein a pair of electrical conductors is coupled to the electrical input of a unit at a portion of the cable from which at least the outer jacket has been removed for a predetermined longitudinal length to provide access to the electrical conductors and wherein the S-Z stranding of the electrical conductors has reversal points spaced apart by less than said predetermined longitudinal lengths.

26. An optical fiber communication system as set forth in claim 25 wherein the buffer tube is S-Z stranded around the strength member with reversal points spaced apart by less than said predetermined longitudinal length.

* * * * *